UNITED STATES PATENT OFFICE.

GUSTAV FUENFSTUECK, OF DENVER, COLORADO, ASSIGNOR TO THE S. & H. SUPPLY AND MACHINERY COMPANY, OF DENVER, COLORADO, A CORPORATION OF COLORADO.

COMPOSITION OF MATTER FOR CURING PUNCTURES IN PNEUMATIC TIRES.

1,070,596.

Specification of Letters Patent.    Patented Aug. 19, 1913.

No Drawing.    Application filed January 24, 1912. Serial No. 673,093.

*To all whom it may concern:*

Be it known that I, GUSTAV FUENFSTUECK, a subject of the Emperor of Germany, residing in the city and county of Denver and State of Colorado, have invented certain new and useful Improvements in Compositions of Matter for Curing Punctures in Pneumatic Tires; and I do declare the following to be a full, clear, and exact description of the invention, such as will enable others skilled in the art to which it appertains to make and use the same.

My invention relates to a composition of matter for use to cure punctures in the pneumatic tires of vehicle wheels. This composition of matter, consists of a liquid containing floating bodies of suitable substance, the floating material being of the same specific gravity as the liquid, in which, it is carried in suspension, the entire volume of liquid being in a homogeneous condition, that is to say, with the floating solid substance disseminated therethrough.

In the use of the composition of matter, it is introduced into the inner tube of the pneumatic tire, after which, the wheel is rotated, and the material automatically closes the puncture, the closure being permanent. In order to obtain these results, the liquid containing the floating solid bodies must not destroy the rubber; it must not plug up the valve through which it is inserted; it must harden when brought in contact with the atmosphere; it must adhere to the rubber in closing the puncture; it must not freeze under ordinary temperature; its puncture curing properties must not be destroyed by heat; it must not spoil in a closed vessel; it must not be dangerous to handle, or of an explosive character. My improved composition of matter possesses all of the foregoing properties in the highest degree.

My improved composition of matter is composed of water, dextrin, alcohol, calcium chlorid, glycerin, and bran, or the outer coat of farinaceous grain, being the husky portion of ground wheat, for instance, separated from the flour by bolting. So far as my experiments and demonstrations have determined, wheat bran gives the best results. The invention, however, is not limited to this particular substance, since it is believed that other similar substances may be employed so long as they possess the same specific gravity as the liquid with which they are combined.

While the invention is not limited to any precise proportions, the following proportions will give good results:

| Ingredient | Amount |
|---|---|
| Water | 4 pounds. |
| Dextrin | 2 pounds. |
| Alcohol | 1 pound. |
| Calcium chlorid | $\frac{1}{8}$ pound. |
| Glycerin | $\frac{1}{8}$ pound. |
| Bran | 1 pound. |

The puncture material composed of these ingredients, is compounded in the following manner: The dextrin is mixed with half of the water in one receptacle; the calcium chlorid and glycerin are then mixed with the other half of the water in another receptacle, the two mixtures are then put together and the bran added, after which, the mass is agitated, and the alcohol finally applied. It is then allowed to stand in a closed vessel. In this manner a heavy flowing liquid, through which the bran is evenly disseminated, is formed. The bran, before mixing it with the other ingredients, is ground or reduced to a condition somewhat more fine than its ordinary condition when separated from the flour, during the manufacture of the latter from wheat, for instance. The calcium chlorid raises the specific gravity of the water and other ingredients in liquid form, making the same sufficiently heavy to hold the bran, or other similar substance, in suspension. The calcium chlorid also prevents the freezing of the compound at ordinary temperatures. The alcohol also gives an anti-freezing quality to the material, and at the same time preserves it. The dextrin forms a sort of binder for the various ingredients. The glycerin may be dispensed with, though its use is preferred.

While a substance composed of the foregoing ingredients performs the puncture curing function, in most satisfactory manner, it is believed that other substances of similar consistency and analogous qualities may be employed, and it is therefore believed, that the scope of the invention should be sufficient to cover a puncture curing compound, composed of liquid in which a puncture curing floating solid substance is held in suspension.

In use, the material is introduced into the inner tube of a pneumatic tire, through the valve tube of the same by employing air pressure, the pressure being applied to the liquid in a vessel, the latter being connected by means of a suitable conduit with the check valve of the tire. In order to use the tube for this purpose, the check valve must be removed and afterward replaced, after which, the tire may be inflated in the usual manner. About one pint of the material should be placed in each tire of ordinary size. After this is done, the wheel containing the tire is rotated, and the centrifugal force serves to throw the puncture curing substance into position to act effectually for the purpose stated.

Before applying the bran and dextrin, or mixing them with the other ingredients, the material should be screened in order to thoroughly separate the particles, and place them in condition to unite with other elements to the best possible advantage.

Attention is called to the fact that the compound is introduced to the tire without removing the latter from the wheel, and the latter may therefore be immediately rotated for the purpose of curing the puncture.

Having thus described my invention, what I claim is:

1. The herein described composition of matter, composed of water, dextrin, alcohol, calcium chlorid, glycerin and bran, combined in suitable proportions, substantially as described.

2. A puncture-curing compound including in its composition water, dextrin, bran, and a sufficient quantity of a comparatively heavy liquid to make the specific gravity of the entire compound equal to that of bran alone.

3. The herein described composition of matter composed of water, dextrin, alcohol, calcium chlorid and bran combined in suitable proportions, substantially as described.

4. The herein described puncture-curing compound including in its composition water, dextrin, calcium chlorid, bran, and a liquid having a low freezing point, combined in suitable proportions.

5. A puncture-curing compound including in its composition water, dextrin, bran, a liquid of sufficient specific gravity to cause the suspension of the bran, and a liquid having a low freezing point, all combined in the proportions substantially as described.

In testimony whereof I affix my signature in presence of two witnesses.

GUSTAV FUENFSTUECK.

Witnesses:
A. J. O'BRIEN,
HARRY B. KORTZ.